United States Patent
Tochadse

(10) Patent No.: US 12,342,434 B2
(45) Date of Patent: Jun. 24, 2025

(54) DRIVER FOR LED RETROFIT WITH PWM CORRECTION UNIT, LED RETROFIT AND VEHICLE HEADLIGHT

(71) Applicant: LUMILEDS LLC, San Jose, CA (US)

(72) Inventor: Gennadi Tochadse, Aachen-Eilendorf (DE)

(73) Assignee: LUMILEDS LLC, San Jose, CA (US)

( * ) Notice: Subject to any disclaimer, the term of this patent is extended or adjusted under 35 U.S.C. 154(b) by 198 days.

(21) Appl. No.: 17/894,734

(22) Filed: Aug. 24, 2022

(65) Prior Publication Data

US 2023/0064700 A1 Mar. 2, 2023

Related U.S. Application Data

(60) Provisional application No. 63/236,522, filed on Aug. 24, 2021.

(51) Int. Cl.
| | |
|---|---|
| H05B 45/30 | (2020.01) |
| B60Q 1/14 | (2006.01) |
| H05B 45/325 | (2020.01) |
| H05B 45/357 | (2020.01) |

(52) U.S. Cl.
CPC ......... *H05B 45/325* (2020.01); *H05B 45/357* (2020.01)

(58) Field of Classification Search
CPC .... H05B 45/30; H05B 45/357; H05B 45/325; H05B 45/37; H05B 45/00; H05B 47/10; H05B 47/18; B60Q 1/0088; B60Q 1/14; F21S 41/14; F21S 41/141; F21S 41/148; F21S 41/192; F21K 9/23; F21K 9/238
See application file for complete search history.

(56) References Cited

U.S. PATENT DOCUMENTS

| | | |
|---|---|---|
| 2006/0226795 A1 | 10/2006 | Walter et al. |
| 2008/0297058 A1* | 12/2008 | Soos ............. H05B 45/382 315/185 R |
| 2016/0319999 A1* | 11/2016 | Elzinga ............. H01L 33/32 |

(Continued)

FOREIGN PATENT DOCUMENTS

| | | |
|---|---|---|
| EP | 3426007 A1 | 1/2019 |
| WO | 2005/107328 | 11/2005 |

OTHER PUBLICATIONS

International Search Report and Written Opinion mailed Nov. 23, 2022 for PCT International Application No. PCT/US2022/041355.

(Continued)

*Primary Examiner* — Thai Pham
(74) *Attorney, Agent, or Firm* — DAY PITNEY LLP; George N. Chaclas

(57) ABSTRACT

A light-emitting diode (LED) driver is described herein. The LED driver includes input terminals that receive power from a pulse width modulation (PWM) power supply operating at a duty cycle less than 100%. The LED driver also includes a current source that receives the power from the input terminals and provides a controlled current with an adjustable target value for at least one LED. The LED driver also includes a PWM correction unit that adjusts the adjustable target value of the controlled current based on the duty cycle of the PWM to provide a constant light output of the LED retrofit lamp independent of the duty cycle of the PWM.

18 Claims, 5 Drawing Sheets

(56) References Cited

U.S. PATENT DOCUMENTS

2016/0353532 A1* 12/2016 Caldwell ................ H05B 45/14
2021/0345463 A1* 11/2021 Perrin, III ............ H05B 45/325

OTHER PUBLICATIONS betterautomotivelighting.com, "Does my care have CANBUS?", https://blog.betterautomotivelighting.com/how-canbus-modules-work-with-led-headlight-bulbs Available at: https://web.archive.org/web/20210515131514/https://blog.betterautomotivelighting.com/how-canbus-modules-work-with-led-headlight-bulbs (May 15, 2021).
XK Glow, "Error Canceller Capacitor For Led Headlight Kits," https://store.xkglow.com/catalog/product/accessories/error-canceller-capacitor-for-led-headlight-kits/, Available at: https://web.archive.org/web/20210420041056/https://store.xkglow.com/catalog/product/accessories/error-canceller-capacitor-for-led-headlight-kits/ (Apr. 20, 2021).

* cited by examiner

DRIVER FOR LED RETROFIT WITH PWM CORRECTION UNIT, LED RETROFIT AND VEHICLE HEADLIGHT

CROSS REFERENCE TO RELATED APPLICATIONS

This application claims the benefit of U.S. Provisional Patent Application No. 63/236,522, which was filed on Aug. 24, 2021, the contents of which are hereby incorporated by reference herein.

BACKGROUND

Light emitting diodes (LEDs), which may include all semiconductor light emitting devices including diode lasers, are more often replacing older technology light sources, such as halogen, gas-discharge, and Xenon, lamps (also referred to herein collectively as conventional lamps) due to superior technical properties, such as energy efficiency and lifetime. This is true also for demanding applications, for example in terms of luminance, luminosity, and/or beam shaping, such as for vehicle headlighting. Considering the vast installation base of conventional lamps, providing so-called LED retrofit lamps (also referred to herein as LED retrofits), more or less one-to-one replacing conventional lamps while allowing continued use of other system components, such as optics (e.g., reflectors and lenses) and luminaires, may be of great economic interest.

SUMMARY

A light-emitting diode (LED) driver is described herein. The LED driver includes input terminals that receive power from a pulse width modulation (PWM) power supply operating at a duty cycle less than 100%. The LED driver also includes a current source that receives the power from the input terminals and provides a controlled current with an adjustable target value for at least one LED. The LED driver also includes a PWM correction unit that adjusts the adjustable target value of the controlled current based on the duty cycle of the PWM to provide a constant light output of the LED retrofit lamp independent of the duty cycle of the PWM.

BRIEF DESCRIPTION OF THE DRAWINGS

A more detailed understanding can be had from the following description, given by way of example in conjunction with the accompanying drawings wherein.

DETAILED DESCRIPTION

Figure 1:
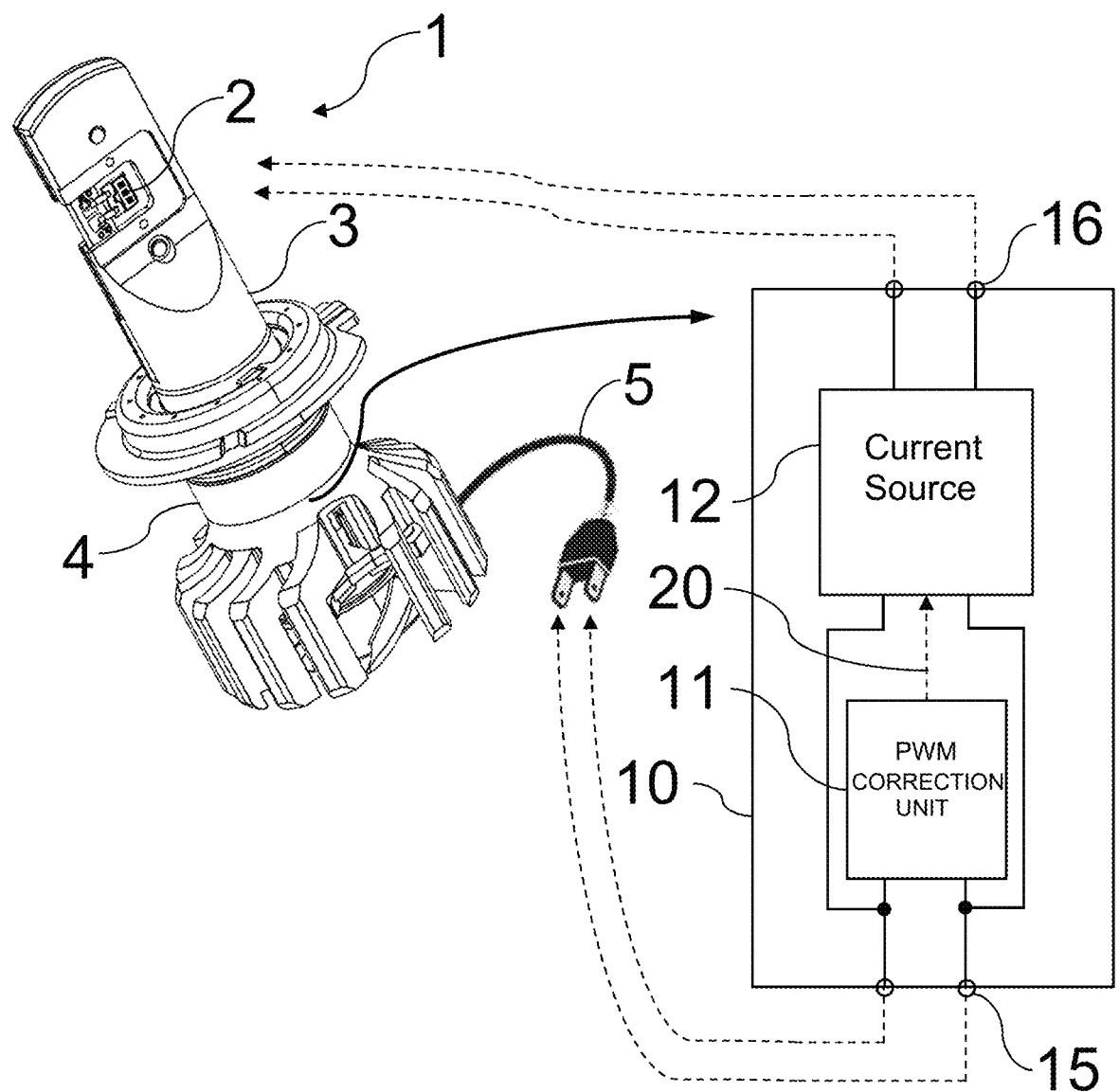
FIG. 1 is a schematic perspective view of an example LED retrofit and a diagrammatic view of an LED driver.

Examples of different light illumination systems and/or light emitting diode ("LED") implementations will be described more fully hereinafter with reference to the accompanying drawings. These examples are not mutually exclusive, and features found in one example may be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, third, etc. may be used herein to describe various elements, these elements should not be limited by these terms. These terms may be used to distinguish one element from another. For example, a first element may be termed a second element and a second element may be termed a first element without departing from the scope of the present invention. As used herein, the term "and/or" may include any and all combinations of one or more of the associated listed items.

It will be understood that when an element such as a layer, region, or substrate is referred to as being "on" or extending "onto" another element, it may be directly on or extend directly onto the other element or intervening elements may also be present. In contrast, when an element is referred to as being "directly on" or extending "directly onto" another element, there may be no intervening elements present. It will also be understood that when an element is referred to as being "connected" or "coupled" to another element, it may be directly connected or coupled to the other element and/or connected or coupled to the other element via one or more intervening elements. In contrast, when an element is referred to as being "directly connected" or "directly coupled" to another element, there are no intervening elements present between the element and the other element. It will be understood that these terms are intended to encompass different orientations of the element in addition to any orientation depicted in the figures.

Relative terms such as "below," "above," "upper,", "lower," "horizontal" or "vertical" may be used herein to describe a relationship of one element, layer, or region to another element, layer, or region as illustrated in the figures. It will be understood that these terms are intended to encompass different orientations of the device in addition to the orientation depicted in the figures.

On replacing a conventional lamp, aside from other constraints, such as light technical data and space limitations, an LED retrofit has to comply with the electrical power supply the conventional lamp is operated with. Some such power supplies use Pulse Width Modulation (PWM) with a controlled duty cycle to operate the conventional lamp with a constant power independent of any fluctuations of the feeding source of the power supply. Such feeding sources, like the mains voltage in a building or the board-net voltage in a vehicle, may show considerable spikes, for example depending on other power consumers being switched on or off.

Halogen lamps in particular may be very sensitive to overvoltage as their filaments may overheat and, for example, evaporate at an increased rate, compromising their lifetime and lumen maintenance. Thus, the car area network (CAN) in particular the CAN buses of many modern cars sense the car's board-net voltage and decrease the duty cycle of the PWM operation of the car lamps of the vehicle headlamps if, for example, an overvoltage is detected. These power supplies may operate the halogen lamps with PWM at a pulse frequency of, for example, 75-200 Hz and with regulating the duty cycle down to 85%, for example.

The light output of a halogen lamp may mainly depend on its filament temperature, and the filament temperature may change only slowly when the PWM power supply switches between on- and off-states. The PWM frequencies may be deliberately selected high enough that light output fluctuations of halogen lamps are only minor and at least not visible to the human eye (being slow as well). Regulating the PWM duty cycle for providing, averaged over several PWM cycles, a constant power to the halogen lamp may further contribute to a steady light output of the halogen lamps.

LED lamps, however, are operated with drivers that may provide a controlled current to the LEDs that determines the power consumed by the LEDs as their voltage drop is largely constant given by the LEDs' forward voltage and, thus, the light output of the LEDs. Therefore, voltage fluctuations of the power supply of an LED driver may have no influence as long as the minimum voltage for the driver is not undercut. With a PWM power supply, however, in the off-time of a PWM cycle, the supply voltage is zero, and the LED driver, having no input power, cannot generate any current. LEDs are fast devices, with their input current falling to zero, and their light output more or less immediately falls to zero as well. This means that the LEDs may emit substantially no light during the off-times of the PWM cycles as used with conventional lamps. A duty cycle of, for example, 85% may therefore result in an LED retrofit emitting only 85% of its expected light, letting the LED retrofit appear dim.

For alleviating such issues, it has been proposed to remove the off-times of the PWM operation by smoothing them out. For that, the market offers PWM adaptors, also termed PWM interface modules, which remove the PWM operation by using a very large capacitance of, for example between 10,000-20,000 µF, to turn the PWM cycles into a constant voltage supply (with a small remaining ripple only). See for examples https://blog.betterautomotivelighting.com/how-canbus-modules-work-with-led-headlight-bulbs and https://store.xkglow.com/catalog/product/accessories/error-canceller-capacitor-for-led-headlight-kits/, which are hereby incorporated herewith by reference.

Such large capacitors, unfortunately, are not only costly but also relatively bulky devices and thus, cannot be integrated, for example, in a socket of a lamp body of an LED retrofit. Additionally, if using a separate housing, such housing may still be much larger than the housing required for the other components of an LED driver.

FIG. 1 is a schematic perspective view of an example LED retrofit 1 and a diagrammatic view of an LED driver 10. In the example illustrated in FIG. 1, the LED driver 10 is integrated in the socket 4 of the lamp body 3 of the LED retrofit 1. The LED driver 10 may receive its electrical input power via power cord 5 from the PWM power supply (not shown) at its input terminals 15. The input voltage may be fed to the current source 12, which may deliver a controlled current with adjustable target value via output terminals 16 to the LEDs 2.

The input voltage may be further fed, in parallel, to the PWM correction unit 11. The PWM correction unit 11 may monitor the input voltage and, thus, the PWM duty cycle, and, from that, determine a target value for the controlled current to be generated by current source 12. The PWM correction unit 11, via current target value line 20, may adjust the target value of the controlled current generated by current source 12 to the such determined target value.

PWM correction unit 11 may, for example, form a moving average of the PWM duty cycle over some PWM cycles and increase the current target value the lower the PWM duty cycle becomes. Denoting the current target value at a 100% PWM duty cycle (i.e., with no off-times) as $I_1$ and assuming, for example, a linear relationship between input current and light output of the LEDs 2, the PWM correction unit 11 may set the current target value $I_{DC}$ at a PWM duty cycle of fraction DC (e.g., DC=0.85 for 85% duty cycle) as: $I_{DC}=I_1/DC$. In general, the PWM correction unit 11 may adjust the current target value $I_{DC}$ in a manner that the LED retrofit, on average, yields a constant light output independent of the duty cycle DC of the PWM operation. In other words, averaged over the PWM duty cycles (as monitored by the PWM correction unit 11), the LED retrofit 1 may emit the same amount of light at each duty cycle DC as it does at a duty cycle of 100% (i.e., without PWM off-times).

The embodiments described herein, thus, may not aim at removing the off-times of the PWM cycle but rather accept that the LED retrofit extinguishes during the off-times (e.g., delivers no light during the off-times). Instead, to integrally (or on average) deliver the same amount of light than without off-times (i.e., at a 100% duty cycle DC=1), it is proposed to increase the light output during the on-times in the same manner as light is missing in the off-times such that the increased light output in the on-times cancels out with the missing light in the off-times.

As the usual PWM duty cycle frequencies of 75-200 Hz are faster than the temporal resolution of the human eye, humans will integrate the increased light during the on-times with the missing light during the off-times and will see a constant light output relating to the nominal light output the LED retrofit was designed for (e.g., the light output at a duty cycle of 100% without off-times). By that, the embodiments described herein provide a new solution to avoid the LED retrofit appearing dim at duty cycles less than 100%. By accepting that the LED retrofit extinguishes during PWM off-times, huge energy storage capacitances are not required, and the PWM correction unit can be implemented in semiconductor technology with only low space requirements. To monitor the PWM duty cycle and its change, the PWM correction unit 11 may remain active also during the off-times and, thus, may need some small capacitance for storing the energy required for its operation during such off-times.

Occupying only minor additional space, the PWM correction unit 11 can be integrated together with other or all driver components within the socket 4 of LED retrofit 1. Of course, the PWM correction unit 11 can also be put in a separate body, alone or in conjunction with other or all LED driver components. Such LED driver body, separate from the LED lamp body, may have advantages with some LED retrofits where the LED lamp body needs to be very small. Such separate installation space for the PWM correction unit 11 could, for example, be considered in a somewhat enlarged plug of the power cord 5.

Figure 2:
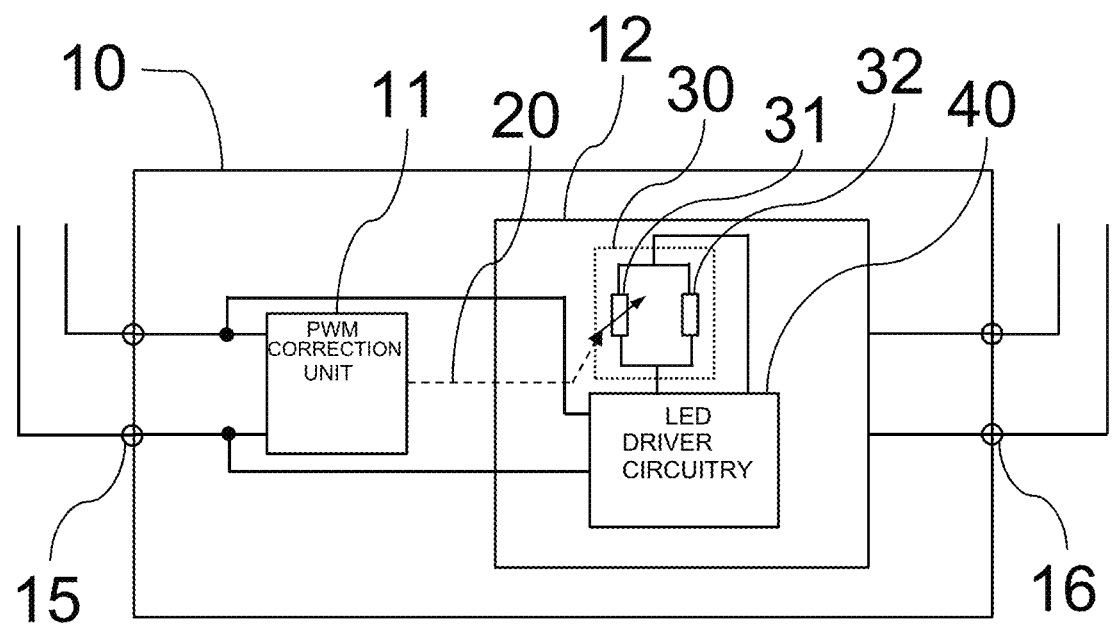
FIG. 2 is a schematic view of another example LED driver.
Figure 3:
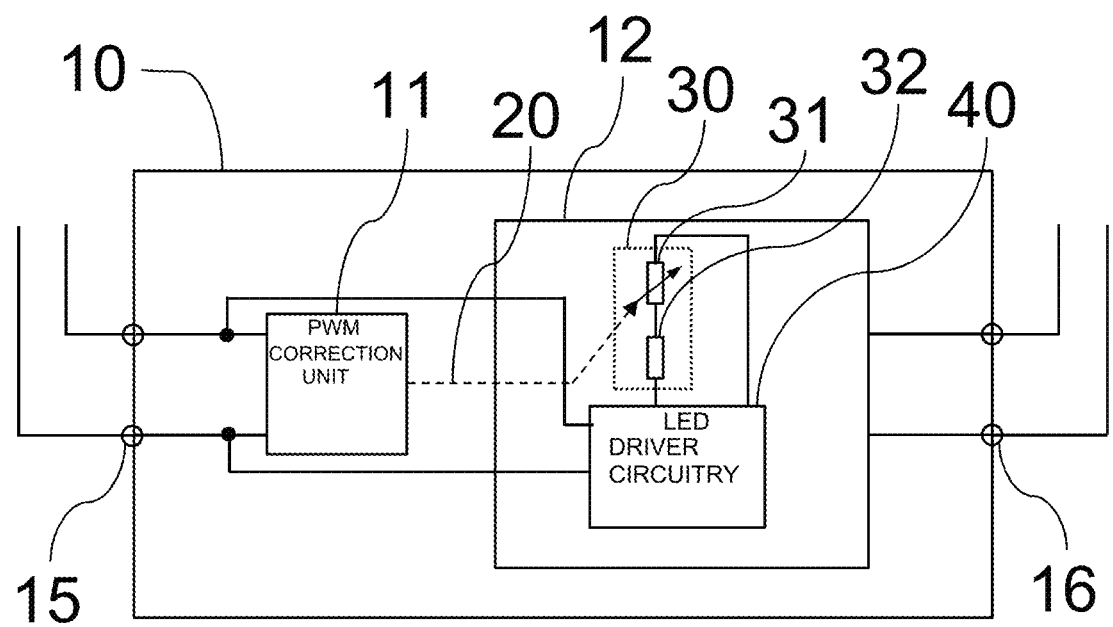
FIG. 3 is a schematic view of another example LED driver.

FIG. 2 is a schematic view of another example LED driver 10. FIG. 3 is a schematic view of another example LED driver 10. In both cases, the current source 12 includes further LED driver circuitry 40 and a current-sense resistor unit 30. The further LED driver circuitry 40, typically including a DC/DC converter IC as a main component, may monitor the voltage drop across the current-sense resistor unit 30 and stabilize such voltage drop to a preset value, such as by the DC/DC converter IC switching between different current paths in the current source 12. By that, the current through current-sense resistor unit 30 may remain constant, and the current source 12 may provide such current as the controlled current to LEDs 2.

For allowing the target value of the controlled current to be adjustable, the resistance of the current-sense resistor unit 30 can be varied using a variable resistor 31. While it would be sufficient to realize the current-sense resistor unit 30 just as a single variable resistor 31, it may be advantageous to combine such variable resistor 31 with a fixed-value resistor 32, which fixed-value may be settable such as by a manual operation. This may allow use of a standard current source 12 with a fixed-value resistor 32 modified by adding a variable resistor 31 in parallel or in series to the fixed-value resistor 32 to obtain the current-sense resistor unit 30 with adjustable resistance. FIG. 2 shows the parallel connection, and FIG. 3 shows the series connection.

The PWM correction unit 11 is connected via the current target value line 20 to the resistance setting input terminal of the variable resistor 31. The PWM correction unit 11 may set the resistance of the variable resistor 31 based on the duty cycle DC of the PWM operation such that an increased light output in the on-times of the PWM operation, on average, balances with the missing light of the LEDs 2 during the off-times.

The variable resistor 31 can be implemented in various ways. One advantageous way may be to use a metal oxide field-effect transistor (MOSFET), and the drain-source resistance (RDS) can be changed by changing the voltage at the MOSFET's gate terminal. The PWM correction unit 11 then would adjust, via the current target value line 20, the gate voltage of the MOSFET avoiding any moving components. However, other solutions would be known to the skilled person and all these possibilities belong to the scope of the embodiments described herein.

An advantageous use of an LED driver, such as described herein, may be with an LED retrofit lamp for a vehicle headlight. Vehicle headlights require high luminous power of the headlamp and, thus, can take light sources to their limits. In modern cars, PWM control for safeguarding the lifetime of halogen lamps may be amply used, and the LED drivers and LED retrofit lamps described herein will strongly benefit from the advantages described herein.

Figure 4:
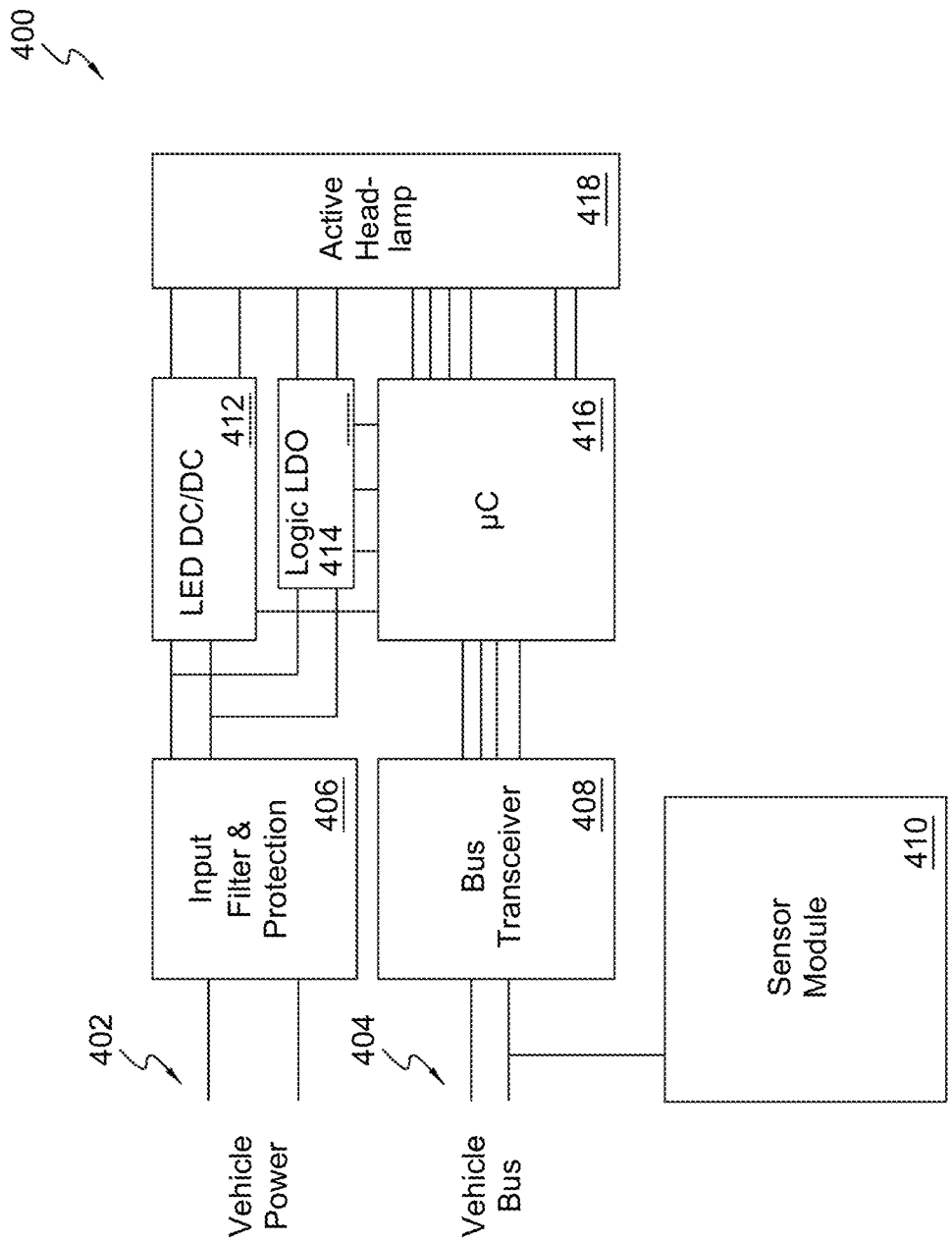
FIG. 4 is a diagram of an example vehicle headlamp system.

FIG. 4 is a diagram of an example vehicle headlamp system 400 that may incorporate one or more of the embodiments and examples described herein. The example vehicle headlamp system 400 illustrated in FIG. 4 includes power lines 402, a data bus 404, an input filter and protection module 406, a bus transceiver 408, a sensor module 710, an LED direct current to direct current (DC/DC) module 412, a logic low-dropout (LDO) module 414, a micro-controller 416 and an active head lamp 418. The LED retrofit described herein can be considered to be one or more of the active head lamps 418. The driver may be fully contained within the active head lamp. However, in some embodiments, some or all parts of the driver may be separate from the active head lamp and/or integrated into the system of FIG. 4 at another location.

The power lines 402 may have inputs that receive power from a vehicle, and the data bus 404 may have inputs/outputs over which data may be exchanged between the vehicle and the vehicle headlamp system 400. For example, the vehicle headlamp system 400 may receive instructions from other locations in the vehicle, such as instructions to turn on turn signaling or turn on headlamps, and may send feedback to other locations in the vehicle if desired. The sensor module 410 may be communicatively coupled to the data bus 404 and may provide additional data to the vehicle headlamp system 400 or other locations in the vehicle related to, for example, environmental conditions (e.g., time of day, rain, fog, or ambient light levels), vehicle state (e.g., parked, in-motion, speed of motion, or direction of motion), and presence/position of other objects (e.g., vehicles or pedestrians). A headlamp controller that is separate from any vehicle controller communicatively coupled to the vehicle data bus may also be included in the vehicle headlamp system 400. In FIG. 4, the headlamp controller may be a micro-controller, such as micro-controller (pc) 416. The micro-controller 416 may be communicatively coupled to the data bus 404.

The input filter and protection module 406 may be electrically coupled to the power lines 402 and may, for example, support various filters to reduce conducted emissions and provide power immunity. Additionally, the input filter and protection module 706 may provide electrostatic discharge (ESD) protection, load-dump protection, alternator field decay protection, and/or reverse polarity protection.

The LED DC/DC module 412 may be coupled between the input filter and protection module 106 and the active headlamp 418 to receive filtered power and provide a drive current to power LEDs in the LED array in the active headlamp 418. The LED DC/DC module 412 may have an input voltage between 7 and 18 volts with a nominal voltage of approximately 13.2 volts and an output voltage that may be slightly higher (e.g., 0.3 volts) than a maximum voltage for the LED array (e.g., as determined by factor or local calibration and operating condition adjustments due to load, temperature or other factors).

The logic LDO module 414 may be coupled to the input filter and protection module 406 to receive the filtered power. The logic LDO module 714 may also be coupled to the micro-controller 416 and the active headlamp 418 to provide power to the micro-controller 416 and/or electronics in the active headlamp 418, such as CMOS logic.

The bus transceiver 408 may have, for example, a universal asynchronous receiver transmitter (UART) or serial peripheral interface (SPI) interface and may be coupled to the micro-controller 416. The micro-controller 416 may translate vehicle input based on, or including, data from the sensor module 410. The translated vehicle input may include a video signal that is transferrable to an image buffer in the active headlamp 418. In addition, the micro-controller 416 may load default image frames and test for open/short pixels during startup. In embodiments, an SPI interface may load an image buffer in CMOS. Image frames may be full frame, differential or partial frames. Other features of micro-controller 416 may include control interface monitoring of CMOS status, including die temperature, as well as logic LDO output. In embodiments, LED DC/DC output may be dynamically controlled to minimize headroom. In addition to providing image frame data, other headlamp functions, such as complementary use in conjunction with side marker or turn signal lights, and/or activation of daytime running lights, may also be controlled.

Figure 5:
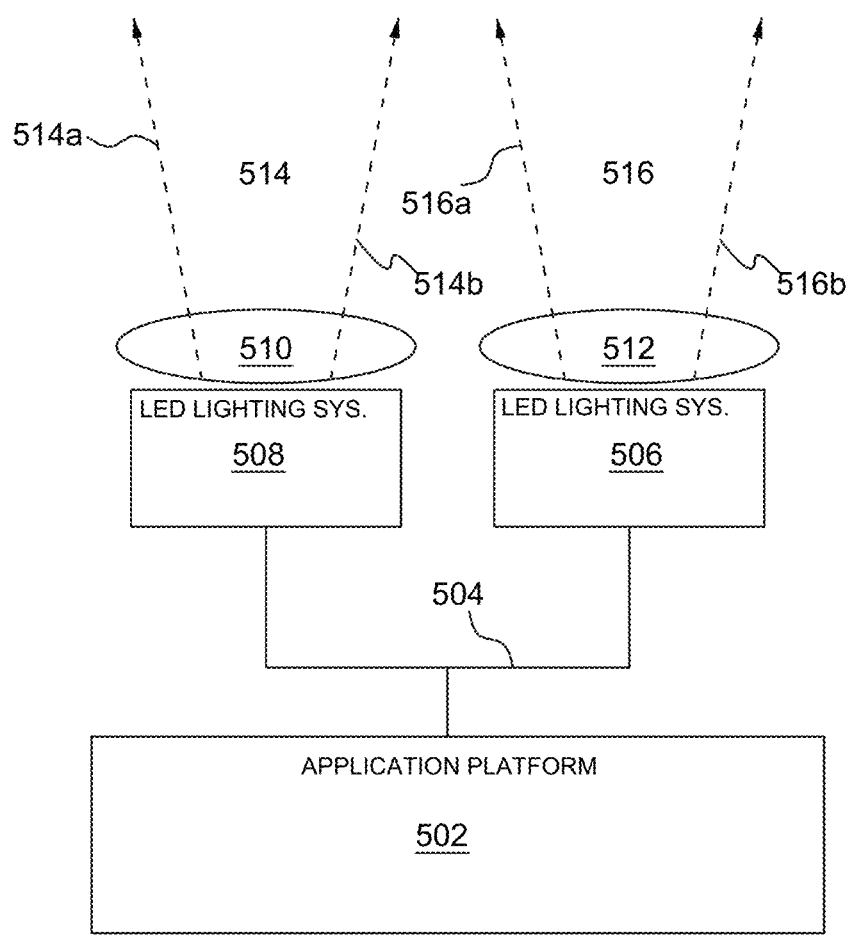
FIG. 5 is a diagram of another example vehicle headlamp system.

FIG. 5 is a diagram of another example vehicle headlamp system 500. The example vehicle headlamp system 500 illustrated in FIG. 5 includes an application platform 502, two LED lighting systems 506 and 508, and secondary optics 510 and 512. Similar to FIG. 4, the LED lighting systems 506 and 508 may include the LED retrofit described herein including the driver. In some embodiments, the driver may be fully contained within the respective LED lighting system or some or all of the driver can be located elsewhere in the system without deviating from the scope of the embodiments described herein.

The LED lighting system 508 may emit light beams 514 (shown between arrows 514a and 514b in FIG. 5). The LED lighting system 506 may emit light beams 516 (shown between arrows 516a and 516b in FIG. 5). In the embodiment shown in FIG. 5, a secondary optic 510 is adjacent the LED lighting system 508, and the light emitted from the LED lighting system 508 passes through the secondary optic 510. Similarly, a secondary optic 512 is adjacent the LED lighting system 506, and the light emitted from the LED lighting system 506 passes through the secondary optic 512. In alternative embodiments, no secondary optics 510/512 are provided in the vehicle headlamp system.

Where included, the secondary optics 510/512 may be or include one or more light guides. The one or more light guides may be edge lit or may have an interior opening that defines an interior edge of the light guide. LED lighting systems 508 and 506 may be inserted in the interior openings of the one or more light guides such that they inject light into the interior edge (interior opening light guide) or exterior edge (edge lit light guide) of the one or more light guides. In embodiments, the one or more light guides may shape the light emitted by the LED lighting systems 508 and 506 in a desired manner, such as, for example, with a gradient, a chamfered distribution, a narrow distribution, a wide distribution, or an angular distribution.

The application platform 502 may provide power and/or data to the LED lighting systems 506 and/or 508 via lines 504, which may include one or more or a portion of the power lines 402 and the data bus 404 of FIG. 4. One or more sensors (which may be the sensors in the vehicle headlamp system 500 or other additional sensors) may be internal or external to the housing of the application platform 502. Alternatively, or in addition, as shown in the example vehicle headlamp system 400 of FIG. 4, each LED lighting system 508 and 506 may include its own sensor module, connectivity and control module, power module, and/or LED array.

In embodiments, the vehicle headlamp system 500 may represent an automobile with steerable light beams where LEDs may be selectively activated to provide steerable light. For example, an array of LEDs or emitters may be used to define or project a shape or pattern or illuminate only selected sections of a roadway. In an example embodiment, infrared cameras or detector pixels within LED lighting systems 506 and 508 may be sensors (e.g., similar to sensors in the sensor module 410 of FIG. 4) that identify portions of a scene (e.g., roadway or pedestrian crossing) that require illumination.

Figure 6:
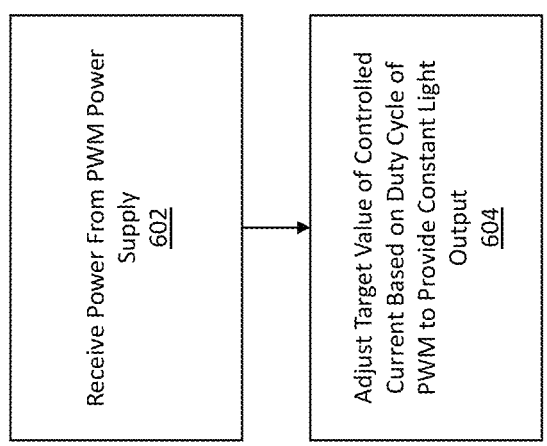
FIG. 6 is a flow diagram of an example method of driving an LED retrofit.

FIG. 6 is a flow diagram of an example method of driving an LED retrofit. In the example illustrated in FIG. 6, the method includes receiving power from a PWM power supply (602). In embodiments, a current source may receive the power from input terminals to the LED retrofit lamp and/or the driver and provide a controlled current with an adjustable target value for the LEDs. A target value of a controlled current may be adjusted based on the duty cycle of the PWM to provide a constant light output (604). In embodiments, a PWM correction unit may adjust the adjustable target value of the controlled current based on the duty cycle of the PWM to provide a constant light output of the LED retrofit lamp independent of the duty cycle of the PWM.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a wireless device, such as a cellular telephone or tablet PC.

Having described the embodiments in detail, those skilled in the art will appreciate that, given the present description, modifications may be made to the embodiments described herein without departing from the spirit of the inventive concept. Therefore, it is not intended that the scope of the invention be limited to the specific embodiments illustrated and described.

What is claimed is:

1. A light-emitting diode (LED) driver comprising:
   a plurality of input terminals configured to receive power from a pulse width modulation (PWM) power supply operating at a duty cycle less than 100%;
   a current source configured to receive the power from the input terminal and provide a controlled current with an adjustable target value for at least one LED; and
   a PWM correction unit comprising a variable resistor configured to adjust the adjustable target value of the controlled current by setting a resistance of the variable resistor based on the duty cycle of the PWM to provide a constant light output of the LED retrofit lamp independent of the duty cycle of the PWM.

2. The LED driver according to claim 1, wherein:
   the current source comprises a current-sense resistor, and
   the variable resistor is electrically coupled in parallel with the current-sense resistor.

3. The LED driver according to claim 1, wherein:
   the current source comprises a current-sense resistor, and
   the variable resistor is electrically coupled in series with the current-sense resistor.

4. The LED driver according to claim 1, wherein the PWM is 85% or less.

5. A light-emitting diode (LED) retrofit lamp comprising:
   an LED lamp body comprising a plurality of LEDs and a socket, the socket having at least one terminal for receiving power from a pulse width modulation (PWM) power supply operating at a duty cycle less than 100%; and
   a driver comprising:
      a plurality of input terminals configured to receive the power via the at least one terminal in the socket,
      a current source configured to receive the power from the input terminals and provide a controlled current with an adjustable target value for the plurality of LEDs, and
      a PWM correction unit comprising a variable resistor configured to adjust the adjustable target value of the controlled current by setting a resistance of the variable resistor based on the duty cycle of the PWM to provide a constant light output of the LED retrofit lamp independent of the duty cycle of the PWM.

6. The LED retrofit lamp according to claim 5, wherein the driver is at least partially located within the socket of the LED lamp body.

7. The LED retrofit lamp according to claim 5, wherein the driver is mounted in an LED driver body separate from the LED lamp body.

8. The LED retrofit lamp according to claim 5, wherein the PWM correction unit comprises a variable resistor, and the PWM correction unit is configured to set a resistance of the variable resistor based on the duty cycle of the PWM.

9. The LED retrofit lamp according to claim 5, wherein: the current source comprises a current-sense resistor, and the variable resistor is electrically coupled in parallel with the current-sense resistor.

10. The LED retrofit lamp according to claim 5, wherein: the current source comprises a current-sense resistor, and the variable resistor is electrically coupled in series with the current-sense resistor.

11. The LED retrofit lamp according to claim 5, wherein the PWM is 85% or less.

12. An automotive lighting system for an automobile that supplies power to headlamps using a pulse width modulation (PWM) power supply operating at a duty cycle less than 100%, the system comprising:
a lamp fixture; and
an LED retrofit lamp secured to the lamp fixture, the LED retrofit lamp comprising:
an LED lamp body comprising a plurality of LEDs and a socket, the socket having at least one terminal for receiving power from a pulse width modulation (PWM) power supply operating at a duty cycle less than 100%; and
a driver comprising:
a plurality of input terminals configured to receive the power via the at least one terminal in the socket,
a current source configured to receive the power from the input terminals and provide a controlled current with an adjustable target value for the plurality of LEDs, and
a PWM correction unit comprising a variable resistor configured to adjust the adjustable target value of the controlled current by setting a resistance of the variable resistor based on the duty cycle of the PWM to provide a constant light output of the LED retrofit lamp independent of the duty cycle of the PWM.

13. The system of claim 12, wherein the driver is at least partially located within the socket of the LED lamp body.

14. The system of claim 12, wherein the driver is mounted in an LED driver body separate from the LED lamp body.

15. The system of claim 12, wherein the PWM correction unit comprises a variable resistor, and the PWM correction unit is configured to set a resistance of the variable resistor based on the duty cycle of the PWM.

16. The system of claim 12, wherein: the current source comprises a current-sense resistor, and the variable resistor is electrically coupled in parallel with the current-sense resistor.

17. The system of claim 12, wherein: the current source comprises a current-sense resistor, and the variable resistor is electrically coupled in series with the current-sense resistor.

18. The system of claim 12, wherein the PWM is 85% or less.

* * * * *